United States Patent [19]

Whiteley et al.

[11] Patent Number: 5,260,404
[45] Date of Patent: Nov. 9, 1993

[54] POLYETHERKETONIMIDES

[75] Inventors: Richard Whiteley, Highworth; Christopher Borrill, Swindon, both of England

[73] Assignee: Raychem Limited, United Kingdom

[21] Appl. No.: 919,640

[22] Filed: Jul. 24, 1992

Related U.S. Application Data

[63] Continuation of Ser. No. 598,717, Dec. 7, 1990, abandoned.

[30] Foreign Application Priority Data

Apr. 19, 1988 [GB] United Kingdom ............. 8809231.7

[51] Int. Cl.$^5$ .................. C08G 8/02; C08G 14/00; C08G 73/10; C08G 69/26
[52] U.S. Cl. .................. 528/125; 528/128; 528/170; 528/171; 528/172; 528/173; 528/183; 528/185; 528/188; 528/220; 528/229; 528/351; 528/352; 528/353
[58] Field of Search ............... 528/125, 128, 170–173, 528/185, 183, 188, 220, 229, 352, 351, 353

[56] References Cited

U.S. PATENT DOCUMENTS 4,820,791  4/1989  Hergenrother et al. ............ 528/125
4,868,271  9/1989  Dahl et al. ......................... 528/171

FOREIGN PATENT DOCUMENTS 0178185  4/1986  European Pat. Off. .
0264194  4/1988  European Pat. Off. .

OTHER PUBLICATIONS

Hergenrother & Havens, "New Semi-Crystalline Polymides", paper presented at The Interdisciplinary Symposium on Recent Advances in Polyimides and Other High Performance Polymers, Reno, Nevada, 1987.

Primary Examiner—John Kight, III
Assistant Examiner—P. Hampton-Hightower
Attorney, Agent, or Firm—Herbert G. Burkard; Yuan Chao

[57] ABSTRACT

Polyetherketoneimides and copolymers thereof having an imide repeat unit of formula

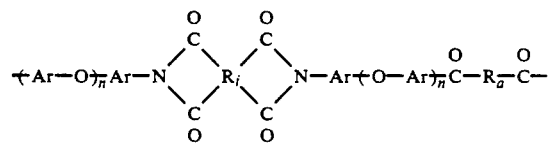

wherein Ri is

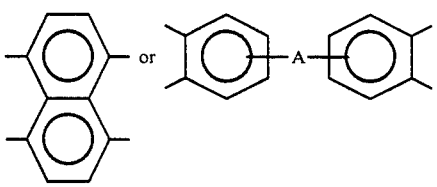

in which A is a direct bond or —O— or another substantially non-electron-withdrawing group, and/or Ra is an at least partly arylene moiety other than m- or P-phonylene.

These polymers tend to have improved melt stability and other properties, especially when made from a pre-existing imide monomer, instead of by the known amic acid route which results in uncyclised amic acid residues in the polymer.

25 Claims, No Drawings

POLYETHERKETONIMIDES

This application is a continuation of application Ser. No 07/598,717, filed Dec. 7, 1990, abandoned.

This invention relates to polyetherketoneimides, hereinafter referred to as PEKImides, which are useful as high performance engineering polymers.

The classical method of polyimide synthesis uses aromatic polyamic acids preparation of which is described in "Preparative Methods of Polymer Chemistry", 2nd Edition by Sorenson and Campbell, pp 170–171. Polyimide films, such as DuPont "Kapton" film, can be made by casting from the 17% solution of polyamic acid formed by such a procedure, followed by a heat setting programme reaching elevated temperatures, at which the polyamic acid intermediate is "heat set", that is imidised. The initial polymer thus tends to be insufficiently melt-stable for melt processing by techniques such as moulding or extrusion, and the heat setting results in a high-temperature-resisting thermoset polyimide which can no longer be dissolved or thermally shaped. It has been shown that the reason for the thermoset character of the polymer after heat setting is that not all of the amic acid groups have cyclised. Some remain as amic acid and some imidise intermolecularly to produce cross-linking. Even after long and tedious heat setting procedures at high temperatures such as 3000 C., only 85% cyclisation has been measured. (J. Poly Sci Polymer Chemistry Ed. Vol 18, pp 1375–1385, 1980; ibid, Vol 19, pp 795–805 1981; J. Macromol. Sci. - Phys., B25(4), pp 405–418 1986). PEKImides made by the amic acid synthesis are described by P M Hegenrother and S J Havens in a paper entitled "New Semicrystalline Polyimides" delivered to The Interdisciplinary Symposium on Recent Advances in Polyimides and other High Performance Polymers, sponsored by the American Chemical Society in Reno, Nevada, 13–16 Jul. 1987.

Enhanced melt stability is expected, however, when the imide repeat units are derived from a preexisting imide monomer, (hereinafter "the imide monomer route") preferably by the method described in EP-A-0178185. The resulting PEKImides can then be substantially free of the un-imidised amic acid residues which result from the known amic acid synthesis. EP-A-0178185 describes such preparation of polymers comprising a repeat unit of formula $-(R_1-O)_n-R_2-CO-$ on which $R_1$ is p-phenylene or 4,4'-biphenylene; $R_2$ among several other complex possibilities may be $-R_1-Y=R_4=Y-R_1-(O-R_1)_n-CO-R_3-$ or $-R_1-CO-R_3-Y=R_4=Y-R_3-$; $R_3$ is alkylene, phenylene, naphthylene, pyridinediyl, or $R_4$ is

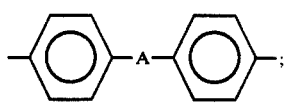

$R_4$ is 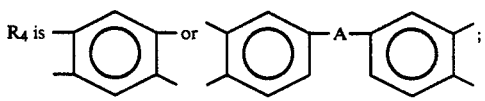

Y among several other possibilities may be

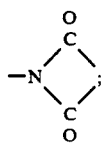

and

A is ether, ketone, sulphone, alkylene, thither, isopropylidene, or a direct bond. Among the many kinds of polymer covered, specific examples of PEKImides described are of the types wherein the grouping $-Y=R_4=Y-$ is

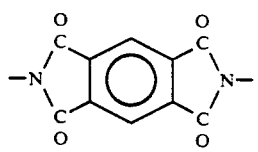

or

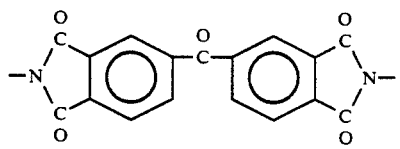

and $R_3$ is phenylene, the polymers for example having the repeat unit

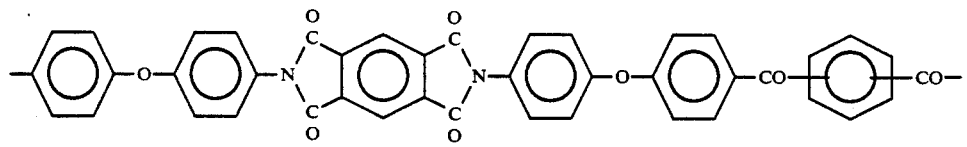

(a)

or

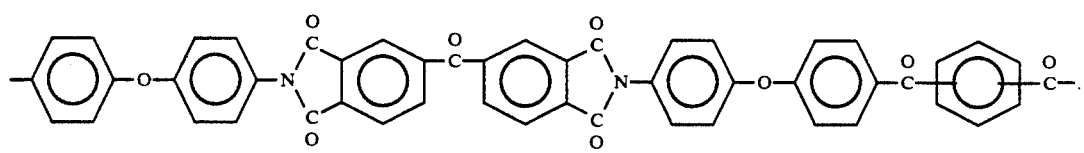

(b)

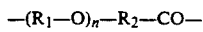

However, despite the absence of unimidised amic acid groups achieved by this superior method of synthesis, the known PEKImides of types (a) and (b) tend to have unexpectedly low melt stability, rendering them difficult to use as thermoplastics for melt processing techniques such as moulding or extrusion.

One aspect of the present invention provides a group of novel PEKImides by the imide monomer route which tend to have improved melt stability and/or other characteristics in terms of properties such as increased glass transition temperature (Tg), or a useful degree of crystallinity, or improved solubility characteristics, or unexpectedly low crystalline melting temperature (Tm), alone or in combination. The novel compounds and improvements according to the invention are achieved by selectively varying the imide grouping and/or replacing the phthaloyl grouping in the above known repeat units.

The invention accordingly provides an ether-ketoneimide polymer comprising an imide repeat unit derived from a pre-existing imide monomer, which imide repeat unit has the formula $$+Ar-O)_{\overline{n}}Ar-N\begin{array}{c}\underset{\parallel}{C}\\ \underset{\parallel}{C}\\ O\end{array}R_1\begin{array}{c}\underset{\parallel}{C}\\ \underset{\parallel}{C}\\ O\end{array}N-Ar+O-Ar)_{\overline{n}}C-R_a-C- \quad (ARR)$$

wherein, subject to the proviso that (i) $R_i$ is

[structure] or [structure]—A—[structure]

in which

A is a direct bond, or —O—, or another substantially non-electron-withdrawing group and/or (ii) $R_a$ is an at least partly arylene moiety other than m-or p- phenylene:

$R_i$ is selected from substituted or unsubstituted

[structure] or (I)

[structure]—C(=O)—[structure] or (II)

[structure]—A—[structure] or (III)

-continued

[structure] (IV)

in which A is a direct bond, O, S, $SO_2$, $CH_2$, $C(CH_3)_2$, $C(CF_3)_2$, $Si(CH_3)_2$, —O—Ar—O—, or A is CO in structures other than II;

$R_a$ is selected from substituted or unsubstituted at least partly arylene moieties attached by their arylene ring carbon atoms to the adjacent —Co—groups of the imide repeat unit;

each Ar independently is a substituted or unsubstituted arylene moiety; and each n independently is 1 or 2, preferably 1 since repetition of the bracketed moiety increases the risk of undesired substitution in the aryl rings during polymerisation.

The invention also provides PEKImide copolymers and homopolymers which are new in themselves, regardless of synthesis method (although the imide monomer route is still preferred) and these aspects of the invention accordingly provide:

Firstly, an ether-ketone-imide copolymer comprising an imide repeat unit of formula (ARR) as defined above and subject to the same proviso, and comprising a further repeat unit, preferably an aryletherketone repeat unit, preferably selected from those of formulae (V) to (XI) hereinafter described;

And secondly, an ether-ketone-imide polymer comprising an imide repeat unit of formula (ARR) above, wherein, subject to the proviso that (i) $R_i$ is

[structure]

or (ii) $R_i$ is

[structure]—A—[structure]

in which

A is a direct bond, O, S, $SO_2$, $CH_2$, $C(CH_3)_2$, $C(CF_3)_2$, $Si(CH_3)_2$, or —O—Ar—O—, and (in case (II))

$R_a$ is an at least partly arylene moiety other than m-phenylene:

$R_a$ is selected from substituted or unsubstituted at least partly arylene moieties attached by their arylene ring carbon atoms to the adjacent —Co—groups of the imide repeat unit;

each Ar independently is a substituted or unsubstituted arylene moiety; and each n independently is 1 or 2, preferably 1 since repetition of the bracketed moiety increases the risk of undesired substitution in the aryl rings during polymerisation.

Where "substituted or unsubstituted" aryl moieties are referred to, the unsubstituted form is preferred, and it will be understood that any substituents which may be present on the aryl rings, for example, lower alkyl, halo, nitro, phenyl, cyano, 2-aralkenyl or alkynyl groups, will preferably be substantially inert, in the sense that they do not interfere to any significant or unacceptable extent with the polymerisation reaction or the polymer characteristics. Small substituents, especially substantially non-electron-withdrawing groups such as methyl or other lower alkyl groups, may be preferable in this respect.

The reference to $R_a$ as an "at least partly arylene" moiety will be readily understood from the preferred selection of $R_a$ from substituted or unsubstituted p-phenylene, m-phenylene, 1,4-naphthylene, 2,6-naphthylene,

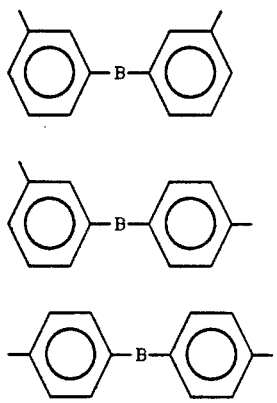

in which B is ether oxygen, ketone, thioether, sulphone, hexafluorisopropylidene, isopropylidene, or a direct bond. The phenylene rings linked by a group B are examples of "partly" arylene moieties when B is other than a direct bond, while the other possibilities in this preferred selection of $R_a$ are all arylene moieties. Useful examples of $R_a$ include

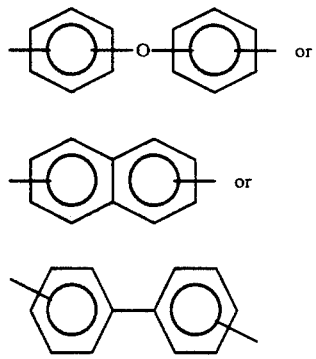

and $R_a$ may be m-', or p-phenylene when part (i) of the aforesaid provisos applies. In the novel polymers subject to the proviso (ii) that $R_i$ is

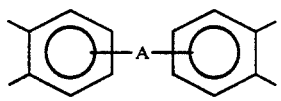

and $R_a$ is other than m-phenylene, $R_a$ may be p-phenylene as well as the other examples listed above.

The linking entity —A— in $R_i$ is preferably substantially non-electron-withdrawing, which term includes a direct bond, —O—, —S—, —CH$_2$—, C(CH$_3$)$_2$, C(CF$_3$)$_2$, Si(CH$_3$)$_2$, for example. Electron-withdrawing —A— groups such as ketone or sulphone may contribute to the melt-instability observed with the aforementioned known PEKImides (a) and (b), and are thus preferably excluded from $R_i$. The instability may be alleviated to some extent by the specified selection of $R_a$ groups other than phenylene, which also tends to benefit other characteristics of the polymers. Especially useful $R_i$ moieties include

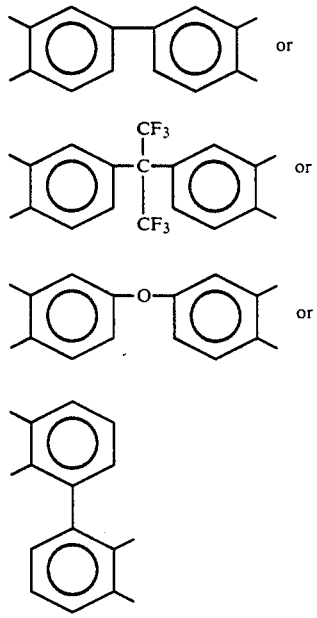

Subject to the aforesaid provisos, A is preferably ether oxygen, sulphone, hexafluoroisopropylidene, isopropylidene, or a direct bond, or A is ketone in structures other than II. For the copolymers and the polymers made by the imide monomer route, A may perhaps also be CO in structures other than II, although this may be less preferable for reasons of stability as already discussed.

The preferred arylene moieties Ar are independently selected from substituted or unsubstituted p-phenylene or m-phenylene or 3,3'-, 3,4'-, or 4,4'-biphenylylene, 1,4-naphthylylene or 2,6-naphthylylene (preferably a group other than naphthylylene since naphthylylene groups are more susceptible to undesired substitution during polymerisation). Preferably, the two Ar moieties respectively attached to the two imide nitrogen atoms are the same as each other, and the other two Ar moieties are the same as each other, all four Ar moieties preferably being the same as one another. Phenylene is most often preferred, especially p-phenylene, for which the preferred polymer synthesis is advantageous in favouring the production of p-linked aryl moieties with negligible or greatly reduced risk of undesired substitution in other positions as described in EP—A—0178185, the disclosure of which is incorporated herein by reference.

Accordingly, the invention includes a method of manufacturing the polymers defined according to this invention comprising polymerising (a) an imide monomer corresponding to the part of the said imide repeat unit containing R_i and having terminal A_r moieties, which terminal A_r moieties have either (case 1) at least one reactive hydrogen and no acyl groups on each terminal A_r or (Case 2) at least one reactive hydrogen on one terminal A_r and an acyl halide group on the other terminal A_r, with (b) an aromatic diacyl halide in Case 1 or with itself in Case 2, in the presence of a Lewis acid catalyst, and preferably in the presence of a Lewis base controlling agent for the Lewis acid catalyst.

Preferred imide monomers are those of Case 11 above, preferably having a 4-phenoxyphenyl moiety attached to each imide nitrogen. The R_i moiety itself may be of formula (I), (II), (III), or (IV) subject to the aforesaid proviso.

Melt stability is also enhanced when the bis-imide structure illustrated by formula (II) of R_i is replaced by structures (III) in which A is ether oxygen, isopropylidene, hexafluoroisopropylidene, or a direct bond. This enhancement is possibly due to the reduction in the number of ketone groups in the R_i imide entity, but it has unexpectedly also been found that the choice of R_a can strongly influence the melt stability of a given imide moiety, for reasons which are not fully understood.

The invention includes copolymers comprising, in addition to the said imide repeat unit, ether ketone repeat units of various kinds. Preferred ether ketone repeat units may be selected from the group consisting of

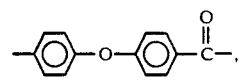 (V)

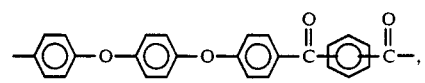 (VI)

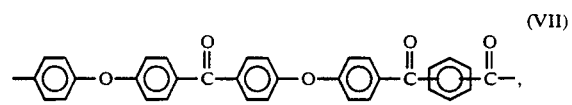 (VII)

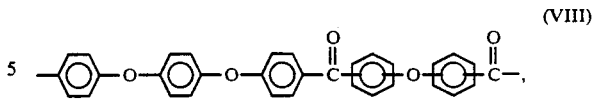 (VIII)

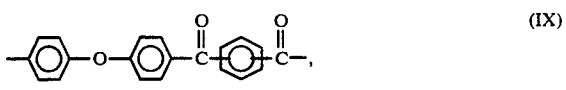 (IX)

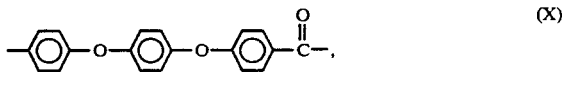 (X)

and

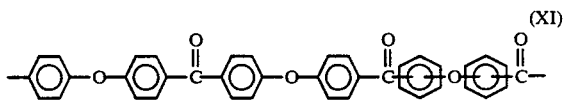 (XI)

To obtain the terminal —Co—A_r—Co—grouping described above at the right hand end of these units, (except V and X) it is generally preferred to add to the reaction medium a mixture of a monomer containing two active hydrogen atoms and a dicarboxylic acid halide. Thus, for example, an equimolar amount of 4,4'-bisphenoxy-benzophenone and terephthaloyl dichloride would be added to the reaction mixture to give repeat units of type (VII). The imide repeat units are preferably formed, in situ, from aryloxy-terminated imide monomers and aromatic diacid halides. Substantially stoichiometric amounts of the diacyl halide and the aryloxyimide and any ketone comonomers are used, subject to the usual small variations in the proportions to control molecular weight and structure. Mixtures of two or more diacyl compounds, two or more aryloxy imides and two or more comonomers may be used, although increasing complexity of the polymer molecule may tend to encourage formation of amorphous polymers.

Thus, preferred imide monomers include the following (the abbreviations in brackets being used to identify these in the specific examples given later herein). The imide monomers may be prepared by known methods, or, for example by reacting the appropriate dianhydorde with the appropriate substituted aniline (usually p-phenosyaniline) in boiling DMAC (N,N-dimethylacetamide) for 30 minutes, followed by cooling, filtering and washing with DMAC followed by methanol.

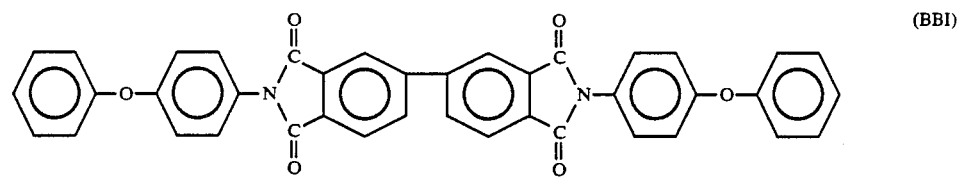 (BBI)

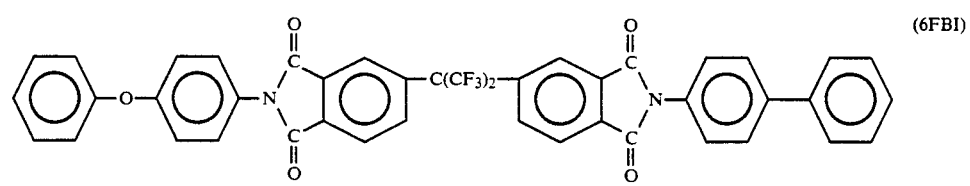 (6FBI)

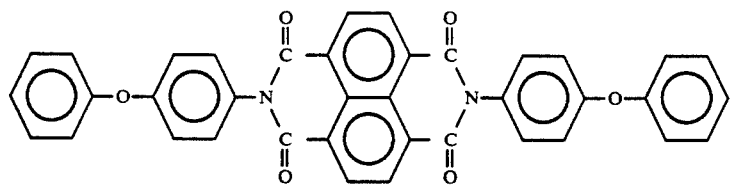
(NBI)
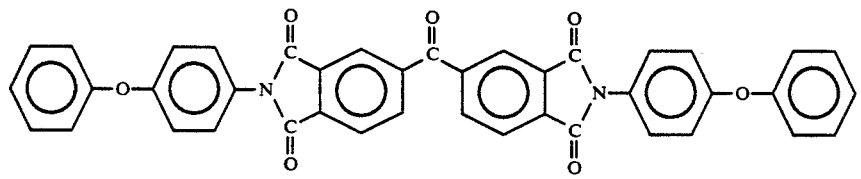
(KBI)
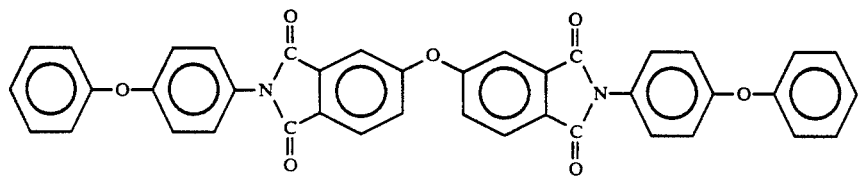
(EBI)
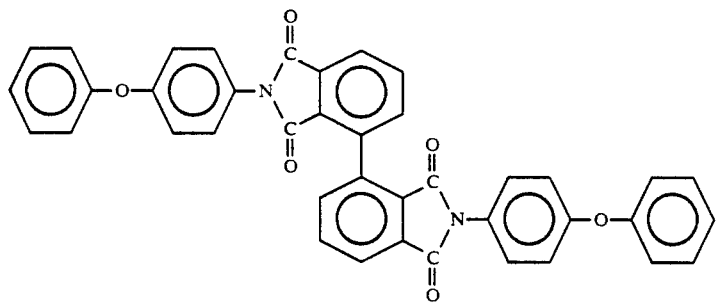
(B2BI)
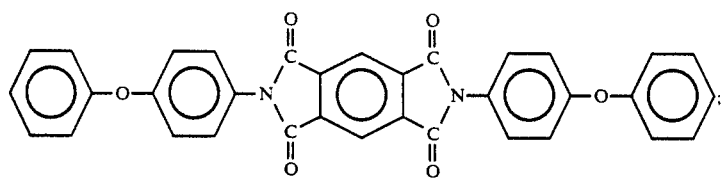
(PBI)
preferred co-monomers for the copolymer further repeat units include
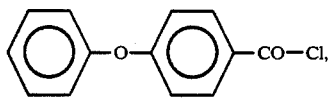,
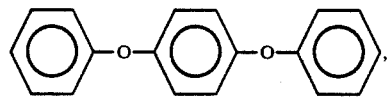,
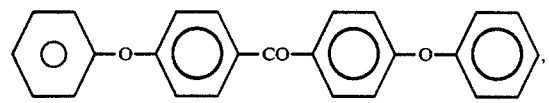,
and
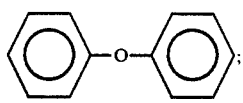;
and preferred diacyl halides include
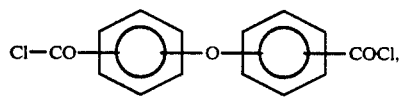,
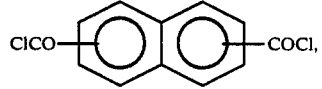,
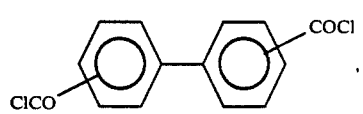

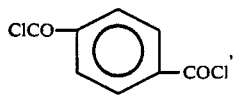

and

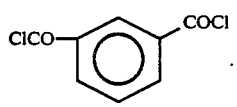

Specifically interesting polymers according to the invention include those wherein the imide repeat unit is

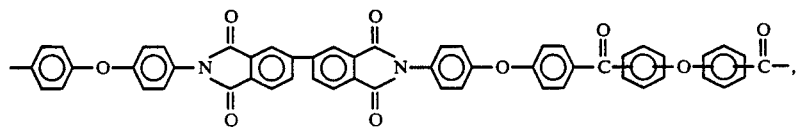

or

——————(same as above)—————— 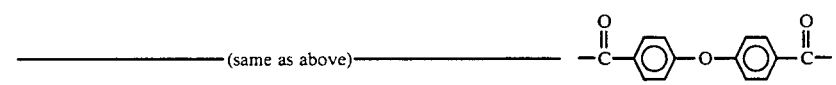

and copolymers thereof where the further repeat unit has the formula V or XI above;

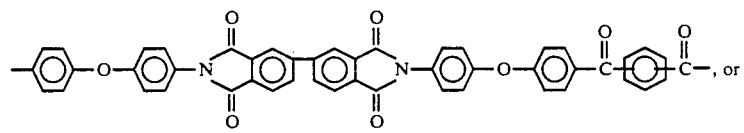

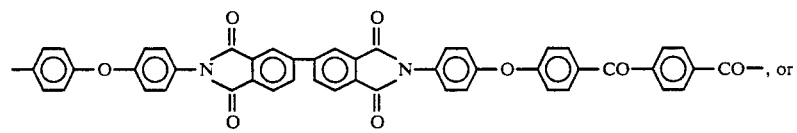

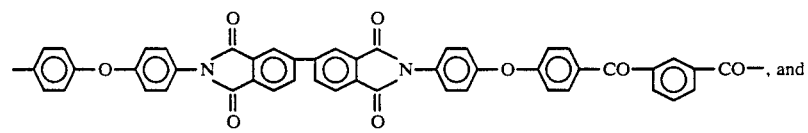

copolymers of any of these three where the further repeat unit has the corresponding isomeric form of formula VII above; and any of these preferred polymers wherein the illustrated imide entity derived from monomer BBI is replaced by that derived from monomer 6FBI, NBI, EBI, or B2BI.

In many cases, the preferred polymers are those which are partly crystalline, for example at least 5%, preferably at least 10%, and more preferably at least 20 percent, crystalline, as measured by X-ray diffraction. Copolymers comprising less than 50, preferably less than 40, and frequently less than 30, mol percent of the imide repeat unit have been found preferable in terms of a tendency towards increased Tg, while maintaining Tm at a convenient level for ease of processing.

In other cases, amorphous polymers according to this invention have useful characteristics, for example solubility in common organic solvents such as chloroform or N-methylpyrrolidone.

The invention is further illustrated by the following specific examples, in which melt viscosities were measured using a capillary rheometer and, unless otherwise stated, a shear rate of 85 Hz. In the examples, the following abbreviations are used for three well known techniques:

TGA = Thermogravimetric Analysis
DSC = Differential Scanning Calorimetry
DMTA = Dynamic Mechanical & Thermal Analysis

EXAMPLE 1

50 ml of 1,2-dichloroethane were stirred and cooled to about −20 C. Aluminium chloride (14.84 g, 0.1113 mole) was added followed by N,N-dimethyl- formamide (3.08 ml, 0.0400 mole). The bisimide BBI (6.2864 g, 0.010000 mole), diphenylether -4,4'-diacid- chloride (3.0371 g, 0.010291 mole), and 4-phenoxy- benzophenone (capping agent, 0.1597 g, 0.000582 mole) were then added. The temperature, which had been kept below −10 C., was then allowed to rise to about 20 C. After 18 hours the rubbery polymer complex was worked up by blending in chilled (about −15 C.) methanol using a Waring blender to give a pale yellow fibrous polymer, followed by boiling in methanol for 2 hours and then drying at 140 C. under vacuum for 2 hours. The yield of polymer was 8.58 g (98.3%), and it had an IV of 1.28 dl/g. The 13 C. and 1H nmr spectra were consistent with the expected structure.

| Elemental analysis: | Al = 540 ppm, Cl = 292 ppm |
| --- | --- |
| | C = 75.9% (Calc. 76.4%) |
| | H = 3.7% (Calc. 3.6%) |
| | N = 3.2% (Calc. 3.2%) |

DSC showed a Tg of 227 C., and a Tm of 399 C.
TGA gave the following data;

|     | 1% wt loss | 1%/min wt loss | Max. rate of wt loss |
| --- | --- | --- | --- |
| Air | 500 C | 509 C | 592 C |
| N2  | 526 C | 539 C | 570 C |

The repeat unit of the polymer is

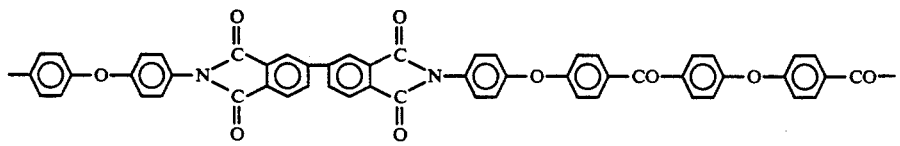

EXAMPLE 2

The polymerisation of Example 1 was repeated using essentially the same procedure but with the following materials; dichloromethane (43 ml), aluminium chloride (12.1 g), N,N-dimethylformamide (1.46 g), the bisimide BBI (6.5380 g), terephthaloylchloride (2.0302 g), and benzoyl chloride (capping agent, 0.1125 g). The work-up was in a mixture of 80% by volume water and 20% by volume methanol. The yield of polymer was 7.56 g (95%), and its IV was 0.89 dl/g. DSC gave a Tg of 233 C., and Tm of 445 C. Some of the polymer was pressed at 450 C. to give a yellow film. DMTA gave a Tg of 242 C.

The repeat unit of the polymer is of reagents. The temperature was raised to 0 C. for 15 minutes and then allowed to rise to room temperature (15-20 C.). After about 6 hours the rubbery reaction mass was blended with a mixture of 400 g ice, 400 ml water and 200 ml methanol in a Waring blender. The resulting polymer was washed with water and then stirred in a mixture of 800 ml water and 200 ml methanol for about 16 hours before it was washed again. The polymer was then boiled in a mixture of 800 ml water, 200 ml methanol and 1.5 ml of concentrated hydrochloric acid. 20 ml of distillate were removed and the mixture was then refluxed for 3 hours after which the polymer was filtered and washed. The polymer was then refluxed for 3 hours in a mixture of 800 ml water, 200 ml methanol and 1.5 ml of '188' ammonia, after which the polymer was filtered, washed, and then dried at 100 C. in air for 1 hour and then at 300 C. in air for 15 hours.

The yield of pale yellow fibrous polymer was 24.2 g (85.5%). It had an IV of 0.57 dl/g and had a melt viscosity of 875 poise after 6.5 minutes at 400 C., and 1400 poise after 31 minutes of 400 C.

The polymer contained the repeat units

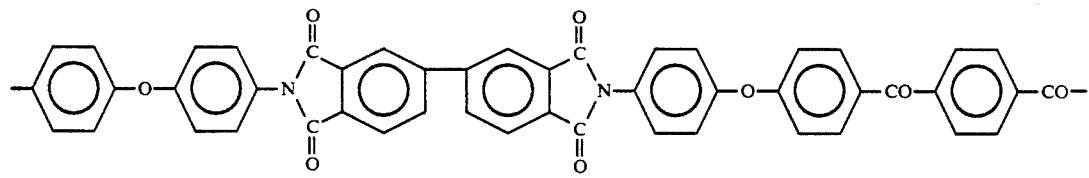

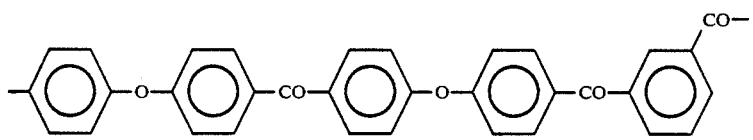

and

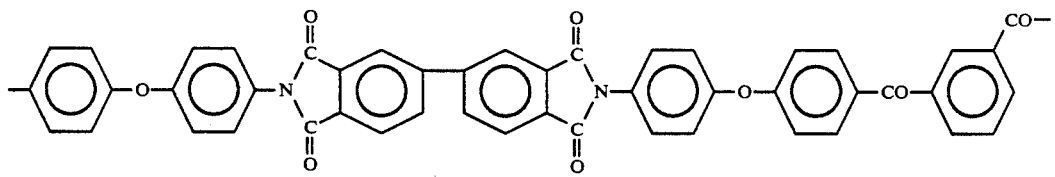

EXAMPLE 3

40 ml of dichloromethane were stirred and cooled to −20° C. in a 500 ml glass resin kettle. The temperature was maintained at between −20 C. and −10 C. while aluminium chloride (41.5 g, 0.3112 mole) was added, followed by N,N-dimethylformamide (6.96 g, 0.0952 mole), isophthaloyl chloride (9.6676 g, 0.04762 mole), benzoyl chloride (capping agent, 0.6828 g, 0.00486 mole), 4.4'-diphenoxybenzophenone (13.7538 g, 0.03754 mole), and the bisimide BBI (7.8656 g, 0.01251 mole). A further 75 ml of dichloromethane was introduced during these additions to facilitate the quantitative transfer in the ratio 3:1.

EXAMPLE 4

The polymerisation of Example 3 was repeated using essentially the same procedure but using the following reactants;

Dichloromethane (30 ml), aluminium chloride (15.1 g, 0.113 mole), N,N-dimethylacetamide (3.4848 g, 0.040000 mole), isophthaloylchloride (2.0302 g, 0.010000 mole), benzoyl choride (0.1434 g, 0.00102 mole), and the bisimide BBI (6.6071 g, 0.01051 mole).

The yield of polymer was 7.51 g (93.7%). It had an IV of 0.85 dl/g.

Elemental analysis: Al=1000 ppm, Cl=6 ppm.

TGA gave the following data;

|    | 1% wt loss | 1%/min wt loss | Max. rate of wt loss |
|----|------------|----------------|----------------------|
| Air | 508 C | 536 C | 651 C |
| N2 | 532 C | 536 C | 561 C |

DSC gave a Tg of 219 c and indicated that the polymer was totally amorphous.

The polymer repeat unit is

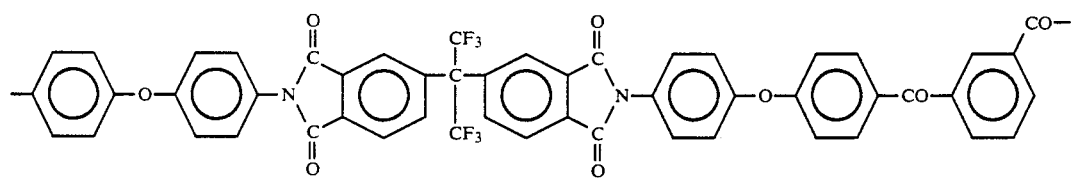

EXAMPLE 5

The polymerisation of Example 1 was repeated using essentially the same procedure but with the following materials; 1,2-dichloroethane (75 ml), aluminium chloride (16.1 g, 0.120 mole), N,N-dimethylformamide (3.33 ml, 0.0432 mole), the bisimide 6FBI (8.5653 g, 0.0110 mole), terephthaloylchloride (2.1927 g, 0.0108 mole) and 3,5-bis(trifluoromethyl)benzoyl chloride (capping agent, 0.1106 g, 0.0004000 mole). The yield of cream coloured fibrous polymer was 9.99 g (99.2%), and its IV was 1.06 dl/g. DSC gave a Tg of 254 C., and indicated that the polymer was totally amorphous. Some of the polymer was pressed at 360 C. to give a clear, tough, pale yellow film. DMTA gave a Tg of 252 C. The polymer was completely soluble in chloroform.

Elemental analysis: Calc. C 67.2 H 2.9 N 3.1 F 12.9; Found (%) Al 0.0500 Cl 0.0360 C 67.3 H 3.0 N 3.2 F 12.2.

TGA gave the following data:

|    | 1% wt loss | 1%/min wt loss |
|----|------------|----------------|
| Air | 480 C | 495 C |
| N2 | 494 C | 508 C |

Another sample was prepared similarly and it had the following properties; the dielectric constant was 3.46 at zero relative humidity, and moisture absorption was 1.5% after 16 hours in 90 C. water. Samples were prepared by dissolving the polymer in N-methylpyrollidone, filtering the solution, coating a film on glass, drying it at 200 C. for 1 hour, removing the film, and drying it for a further 6 days at 200 C.

The polymer repeat unit is

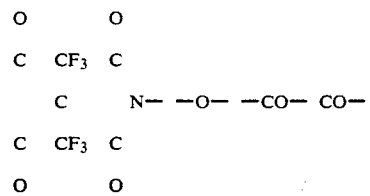

EXAMPLE 6

The polymerisation of Example 5 was repeated using essentially the same procedure but using isophthaloylchloride instead of terephthaloylchloride. The polymer yield was 9.70 g (96.4%), and its IV was 0.94 dl/g. DSC gave a Tg of 233 C., and indicated that the polymer was totally amorphous. The polymer was completely soluble in chloroform.

TGA gave the following data;

|    | 1% wt loss | 1%/min wt loss |
|----|------------|----------------|
| Air | 472 C | 492 C |
| N2 | 478 C | 503 C |

The polymer repeat unit is

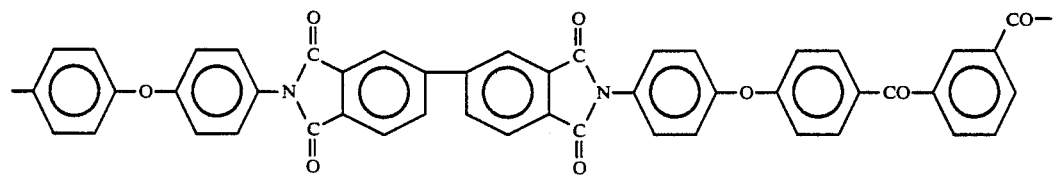

EXAMPLE 7

The polymerisation of Example 1 was repeated using essentially the same procedure but with the following materials; dichloromethane (149 ml), aluminium chloride (44.0 g, 0.33 mole), dimethylsulphone (10.46 g, 0.1111 mole), the bisimide BBI (3.5973 g, 0.0057200 mole), isophthaloylchloride (11.2789 g, 0.05556 mole), 4,4'-diphenoxybezophenone (18.8706 g, 0.0515000 mole), and benzoyl chloride (capping agent, 0.4686 g, 0.00333 mole). The yield of polymer was 29.42 g (97.9%), and its IV was 0.80 dl/g.

Elemental analysis: Al=480 ppm, Cl=261 ppm, S=43 ppm.

DSC gave a Tg of 163 C., and a Tm of 304 C.

TGA gave the following data;

|    | 1% wt loss | 1%/min wt loss | Max. rate of wt loss |
|----|------------|----------------|----------------------|
| Air | 510 C | 515 C | 637 C |
| N2 | 508 C | 520 C | 555 C |

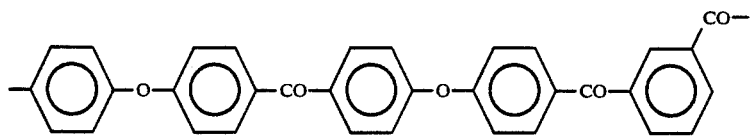

and

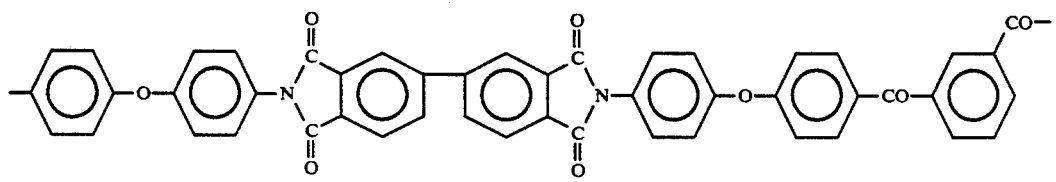

in the ratio 9:1.

EXAMPLE 8

The polymerisation of Example 1 was repeated using essentially the same procedure but with the following materials; 1,2-dichloroethane (110 ml), aluminium chloride (19.1 g, 0.143 mole), N,N-dimethylformamide (5.24 ml, 0.0680 mole), the bisimde 6FBI (2.6475 g, 0.0034000 mole), 4,4′-diphenoxybenzophenone (5.0566 g, 0.0138 mole, terephthaloylchloride (3.4514 g, 0.017000 mole and pentafluoro-benzoyl chloride (capping agent, 0.0922 g, 0.000400 mole). The yield of fibrous polymer was 9.32 g (93.3%), and its IV was 1.32 dl/g. DSC gave a Tg of 188 C., and indicated a relatively low degree of crystallinity with a Tm of 345 C.

TGA:

|  | 1% wt loss | 1%/min wt loss |
|---|---|---|
| Air | 501 C | 517 C |
| N2 | 497 C | 522 C | and in the ratio 4.06:1.

EXAMPLE 9

The polymerisation of Example 3 was repeated using essentially the same procedure but using the following reactants;

Dichloromethane (128 ml), aluminium chloride (41.5 g, 0.3112 mole), N,N-dimethylformamide (6.961 g, 0.09524 mole), terephthaloylchloride (9.6676 g, 0.04762 mole), benzoyl chloride (0.6828 g, 0.00486 mole), 4,4′-diphenoxybenzophenone (13.7538 g, 0.03754 mole, and the bisimide 6FBI (9.7426 g, 0.01251 mole).

The yield of white fibrous polymer was 27.3 g (90.4%). It had an IV of 0.61 dl/g and had a melt viscosity of 6830 poise after 6.5 minutes at 400 C., and 10900 poise after 31.5 minutes at 400 C.

The polymer contained the repeat units

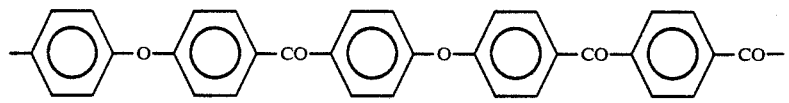

and

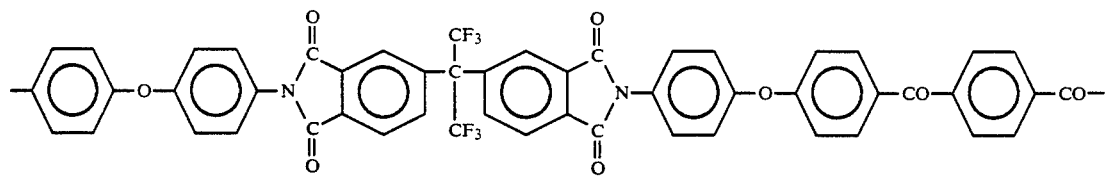

in the ratio 3:1.

The polymer contains the repeat units

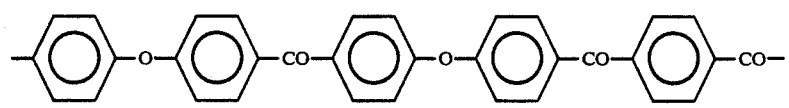

and

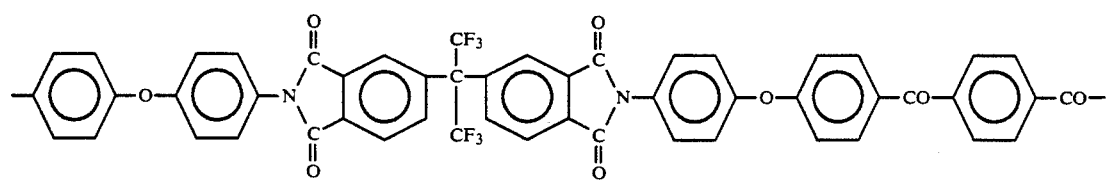

EXAMPLE 10

The polymerisation of Example 3 was repeated using essentially the same procedure but using the following reactants;

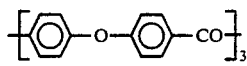

and

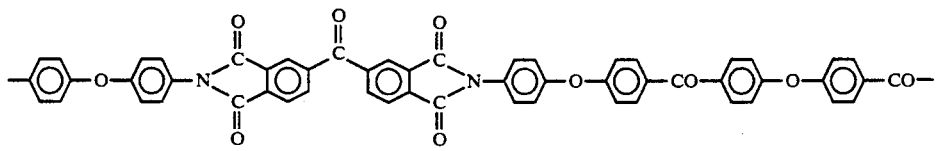

Dichloromethane (129 ml), aluminium chloride (42.9 g, 0.322 mole), N,N-dimethylformamide (6.961 g, 0.09524 mole), naphthalene-2,6-diacidchloride (12.0519 g, 0.04762 mole), benzoyl chloride (0.4686 g, 0.00333 mole), 4,4'-diphenoxybenzophenone (13.5445 g, 0.03696 mole), and the bisimide KBI (8.0909 g, 0.01232 mole).

The yield of pale yellow fibrous polymer was 27.2 g (89.0%). It had an IV of 1.20 dl/g and had a melt viscosity of 75250 poise after 7 minutes at 400 C., and 99800 poise after 17 minutes at 400 C. The average rate of increase in melt viscosity over the 10 minute period was 3.3% per minute, compared with 22.9% per minute for the polymer described in comparison Example 26 and 40% per minute for the polymer described in comparison Example 25.

Repeat units:

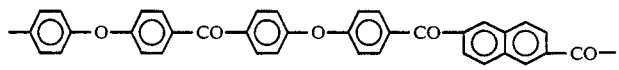

and

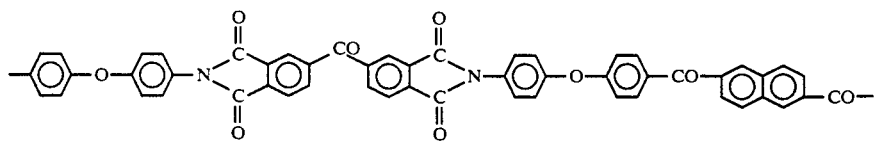

in the ratio 3:1

EXAMPLE 11

The polymerisation of Example 3 was repeated using essentially the same procedure but using the following reactants;

Dichloromethane (142 ml), aluminium chloride (43.3 g, 0.325 mole), N,N-dimethylformamide (6.961 g, 0.09524 mole), diphenylether-4,4'-diacidchloride (14.0533 g, 0.04762 mole), benzoyl chloride (0.6828 g, 0.00486 mole), 4,4'-diphenoxybenzophenone (13.7538 g, 0.03754 mole), and the bisimide KBI (8.2159 g, 0.01251 mole).

The yield of pale yellow fibrous polymer was 30.0 g (90.8%). It had an IV of 0.55 dl/g and had a melt viscosity of 10200 poise after 6.5 minutes at 400 C., and 36800 poise after 31.5 minutes at 400 C.

The polymer contained the repeat units

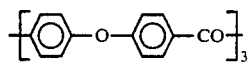

and in the ratio 3:1

EXAMPLE 12

The polymerisation of Example 1 was repeated using essentially the same procedure but with the following materials; 1,2-dichloroethane (60 ml), aluminium chloride (13.32 g, 0.0999 mole), dimethylsulphone (3.71 g, 0.0398 mole), the bisimide KBI (3.3579 g, 0.005114 mole), diphenylether-4,4'-diacidchloride (2.9298 g, 0.009927 mole), 4,4'-diphenoxybenzophenone (1.8738 g, 0.005114 mole), and benzoyl chloride (capping agent, 0.0843 g, 0.000600 mole). The yield of polymer was 7.35 g (98%), and its IV was 0.87 dl/g.

Elemental analysis: Al=800 ppm, Cl=562 ppm.

A sample was melted in a glass tube using a hot air gun. It gave a clear, low viscosity, orange/brown melt which partially crystallised on cooling to give a very tough material.

DSC gave a Tg of 194 C. and a Tm of 378 C.

A 1 g pressed disc was hot pressed at 400 C. between Al foils (5 min preheat+30 sec at 40 tons) to give a tough film. DMTA of this film gave a Tg of 193 C.

TGA gave the following data;

|  | 1% wt loss | 1%/min wt loss | Max. rate of wt loss |
|---|---|---|---|
| Air | 492 C | 517 C | 642 C |
| N2 | 518 C | 529 C | 556 C |

The polymer contained the repeat units

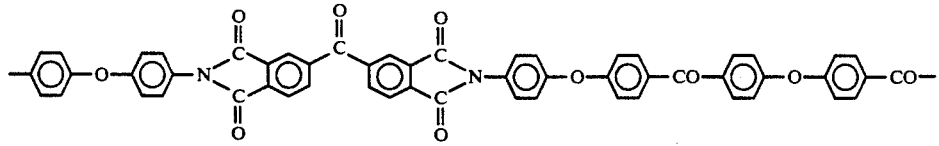

in the ratio 1:1

EXAMPLE 13

The polymerisation of Example 3 was repeated using essentially the same procedure but with the following

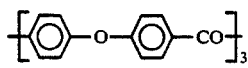

and

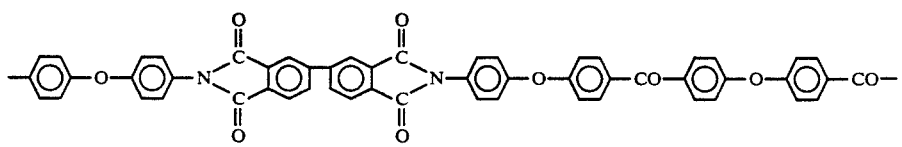

reactants;

Dichloromethane (132 ml), aluminium chloride (47.9 g, 0.3594 mole), N,N-dimethylformamide (8.1211 g, 0.11111 mole), terephthaloylchloride (11.2789 g, 0.05556 mole), benzoyl chloride (0.5467 g, 0.00389 mole), 4,4'-diphenoxybenzophenone (15.8019 g, 0.04313 mole), and the bisimide NBI (8.6625 g, 0.01438 mole).

The polymer yield was 30.0 g (93.5%). It had an IV of 0.78 dl/g and had a melt viscosity of 27100 poise after 6.25 minutes at 400 C., and 34700 poise after 31 minutes at 400 C.

The polymer contained the repeat units

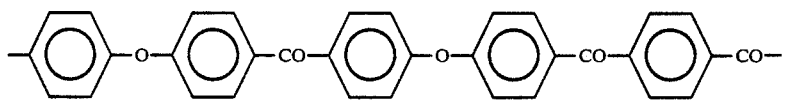

and

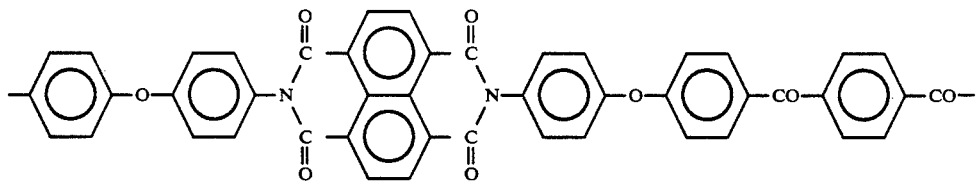

in the ratio 3:1.

EXAMPLE 14

The polymerisation of Example 3 was repeated using essentially the same procedure but using the following reactants;

Dichloromethane (140 ml), aluminium chloride (41.5 g, 0.3112 mole), dimethylsulphone (8.965 g, 0.09524 mole), diphenylether-4,4'diacidchloride (14.0533 g, 0.04762 mole), benzoyl chloride (0.6268 g, 0.00486 mole), 4,4'-diphenoxybenzophenone (13.7538 g, 0.03754 mole), and the bisimide BBI (7.8656 g, 0.01251 mole).

The yield of pale yellow fibrous polymer was 30.0 g (91.7%). It had an IV of 0.54 dl/g and had a melt viscosity of 1660 poise after 6.5 minutes at 400 C. and 1930 poise after 16 minutes at 400 C. The average rate of increase in viscosity over the 9.5 minute period was 1.7% per minute, compared with 23% and 40% as mentioned in Example 10.

The polymer contained the repeat units in the ratio 3:1.

EXAMPLE 15

The polymerisation of Example 1 was repeated using essentially the same procedure but with the following materials; 1,2-dichloroethane (70 ml), aluminium chloride (20.9 g, 0.156 mole), N,N-dimethylformamide (5.12 g, 0.0701 mole), the bisimide BBI (3.7719 g, 0.0060000 mole), diphenylether-4,4'-diacidchloride (5.1685 g, 0.017513 mole), 4,4'-diphenoxybenzophenone (4.3970 g, 0.012000 mole), and benzoyl chloride (capping agent, 0.1369 g, 0.000974 mole). The yield of polymer was 11.99 g (98.6%), and its IV was 0.74 dl/g.

Elemental analysis: Al=490 ppm, Cl=250 ppm.

DSC gave a Tg of 179 C., a Tc of 240 C., and a Tm of 343 C. A 1 g pressed disc was hot pressed at 400 C. between Al foils ( 5 min preheat+30 sec at 40 tons) giving a clear, yellow, tough film. DMTA gave a Tg of 180 C.

TGA gave the following data;

|  | 1% wt loss | 1%/min wt loss | Max. rate of wt loss |
| --- | --- | --- | --- |
| Air | 472 C | 520 C | 639 C |

| | 1% wt loss | 1%/min wt loss | Max. rate of wt loss |
|---|---|---|---|
| | -continued | | |
| N2 | 519 C | 529 C | 563 C |

The polymer contained the repeat units

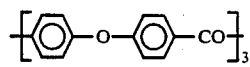

and

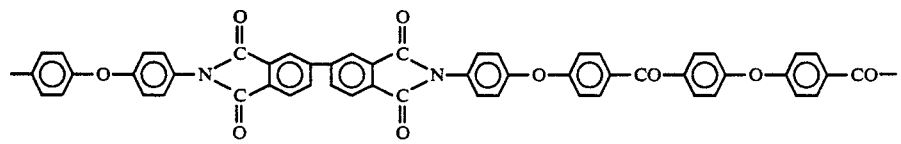

in the ratio 2:1.

| | 1% wt loss | 1%/min wt loss | Max. rate of wt loss |
|---|---|---|---|
| Air | 499 C | 524 C | 634 C |
| N2 | 515 C | 529 C | 554 C |

EXAMPLE 16

The polymerisation of Example 1 was repeated using essentially the same procedure but with the following materials; dichloromethane (60 ml), aluminium chloride (15.97 g, 0.120 mole), dimethylsulphone (4.95 g, 0.0526 mole), the bisimide BBI (3.3087 g, 0.0052633 mole), terephthaloylchloride (2.6713 g, 0.013158 mole), 4,4'-diphenoxybenzophenone (3.0114 g, 0.0082185 mole), and benzoyl chloride (capping agent, 0.0910 g, 0.000647 mole). The yield of polymer was 7.91 g (97.7%), and its IV was 1.16 dl/g.

Elemental anyalysis: Al=490 ppm, Cl=226 ppm.
DSC gave a Tg of 200 C. and a Tm of 367 C.
A 1 g pressed disc was hot pressed at 400 C. between Al foils (5 min preheat+30 sec at 40 tons) giving a very good quality, clear, yellow, tough film. DMTA gave a Tg of 198 C.
TGA gave the following data;

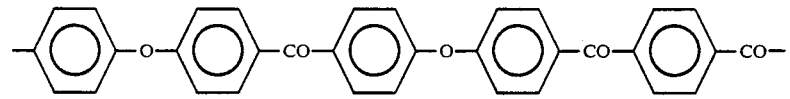

and

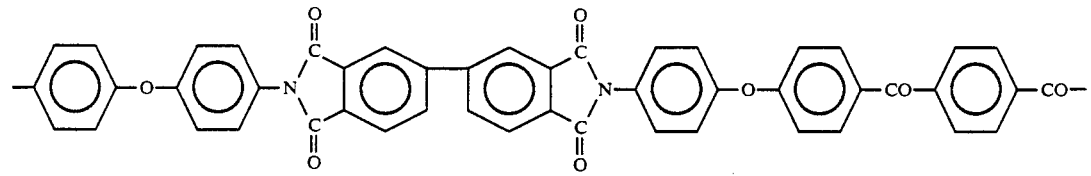

in the ratio 4.5:1.

EXAMPLE 17

The polymerisation of Example 1 was repeated using essentially the same procedure but with the following materials; dichloromethane (60 ml), aluminium chloride (12.8 g, 0.096 mole), dimethylsulphone (3.55 g, 0.0377 mole), the bisimide BBI (4.2765 g, 0.0068028 mole), diphenylether-4,4'diacidchloride (2.7795 g, 0.0094183 mole), 4,4'-diphenoxybenzophenone (1.0683 g, 0.0029155 mole), and benzoyl chloride (capping agent, 0.0843 g, 0.000600 mole). The yield of polymer was 7.17 g (95.6%), and its IV was 0.78 dl/g.
TGA gave the following data;

| | 1% wt loss | 1%/min wt loss | Max. rate of wt loss |
|---|---|---|---|
| Air | 465 C | 520 C | 631 C |
| N2 | 515 C | 526 C | 561 C |

The polymer contained the repeat units

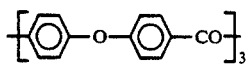

and

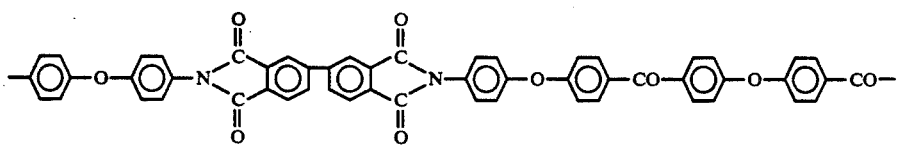

in the ratio 0.43:1.

EXAMPLE 18

The polymerisation of Example 3 was repeated using essentially the same procedure but with the following reactants;

Dichloromethane (128 ml), aluminium chloride (141.1 g, 0.3081 mole), N,N-dimethylformamide (6.961 g, 0.09524 mole), 2,6-naphthalene diacidchloride(12.052 g, 0.04762 mole), benzoyl chloride (0.4686 g, 0.00333 mole), 4,4'diphenoxybenzophenone (13.5445 g, 0.03696 mole), and the bisimide BBI (7.7459 g, 0.01232 mole).

The yield of pale yellow fibrous polymer was 26.9 g (89.0%). It had an IV of 0.98 dl/g and had a melt viscosity of 31500 poise after 6.5 minutes at 400 C., and 42900 poise after 31 minutes at 400 C.

The polymer contained the repeat units

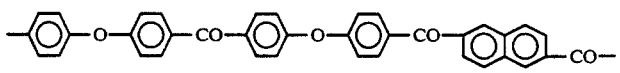

and

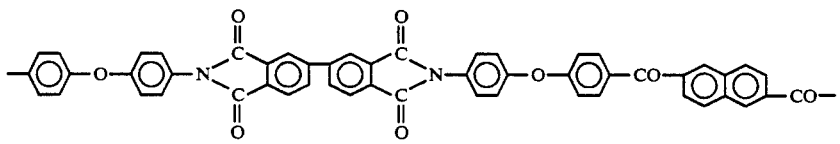

and
in the ratio 3:1.

EXAMPLE 19

The polymerisation of Example 1 was repeated using essentially the same procedure but with the following materials; dichloromethane (33 ml), aluminum chloride (8.9 g), N,N-dimethylformamide (1.46 g), the bisimide BBI (1.9614 g), 2,6-naphthalene-diacidchloride (2.5309 g), 4,4'-diphenoxybenzophenone (2.6675 g), and benzoyl chloride (capping agent 0.1125 g). The yield of polymer was 6.34 g (97.3%), and its IV was 0.73 dl/g.

DSC gave a Tg of 200 C., and Tm's of 345 C and 370 C.

The polymer contained the repeat units

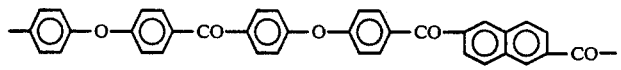

and

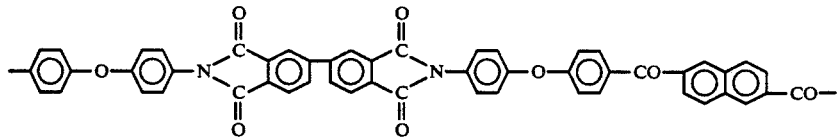

in the ratio 2.33:1.

EXAMPLE 20

The polymerisation of Example 3 was repeated using essentially the same procedure but with the following reactants;

Dichloromethane (116 ml), aluminium chloride (41.5 g, 0.3112 mole), dimethyl sulphone (8.96 g, 0.0952 mole, terephthaloyl chloride (9.6676 g, 0.04762 mole), benzoyl chloride (0.6828 g, 0.00486 mole), 4,4'-diphenoxybenzophenone (13.7538 g, 0.03754 mole), and the bisimide BBI (7.8656 g, 0.01251 mole).

The yield of pale yellow fibrous polymer was 24.9 g (87.9%). It had an IV of 0.70 dl/g and had a melt viscosity of 6475 poise after 9 minutes at 400 C., and 10200 poise after 35.5 minutes at 400 C. The average rate of increase in melt viscosity over the 26.5 minute period was 2.2% per minute, compared with 22.9% per minute for the polymer described in Comparison Example 26, and 40% per minute for the polymer described in Comparison Example 25.

The polymer contained the repeat units

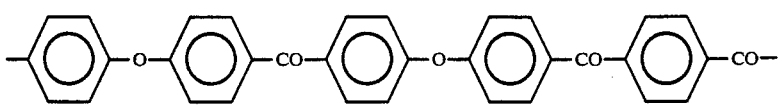

and

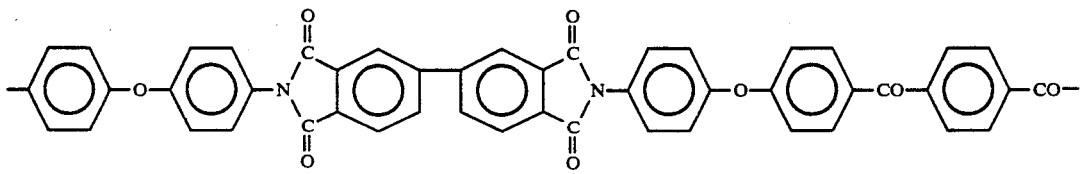

in the ratio 3:1.

EXAMPLE 21

A 10 liter Hastalloy B vessel was charged with 3.5 liters of dichloromethane. This was stirred and cooled to −13 C. The temperature was maintained at between −15 C. and −4 C. while aluminium chloride (1766 g, 13.24 mole) was added, followed by dimethylsulphone (282.4 g, 3.000 mole), 4,4'-diphenoxybenzophenone (528.38 g, 1.4420 mole), the bisimide BBI (388.51 g, 0.61800 mole), terephthaloyl chloride (406.04 g, 2.0000 mole), and benzoyl chloride (capping agent, 16.868 g, 0.12000 mole). A further 356 ml of dichloromethane was introduced during these additions to facilitate the quantitative transfer of reagents. The vessel was pressurised to 50 psi with nitrogen and the temperature was raised to 20 C. when the contents were transferred into a PTFE lined steel tube as described in copending U.S. Ser. No. 110899, the disclosure of which is incorporated herein by reference, and maintained at a temperature of 25 C. for 6 hours. The orange/brown rubbery polymer complex was then discharged from the tube, using a hydraulic ram, into a hammer mill where it was decomplexed in about 40 liters of a mixture of 95% by volume water and 5% by volume methanol which had been cooled to between 0 and 5 C. The resulting polymer was filtered and washed with about 20 liters of water three times. It was then stirred for about 80 hours in a mixture of about 23 liters of water and 6 liters of methanol. This mixture was then boiled and about 3 liters of distillate were removed before the polymer was filtered and washed again with about 20 liters of water three times. The polymer was then dried at 125 C. in air for 20 hours. The yield of pale yellow fibrous polymer was 1077 g (90.5%). The IV was 0.98 dl/g.

75 g of this polymer was further dried at 300 C. in air for about 16 hours. The melt viscosity after 5 minutes at 400 C. was 9420 poise at 500 Hz, 18600 poise at 85 Hz, and 28200 poise at 20 Hz. The melt viscosity after 30 minutes at 400 C. was 9660 poise at 500 Hz, 21800 poise at 85 Hz, and 37500 poise at 20 Hz. The average rate of increase in melt viscosity at 85 Hz over the 25 minute period was 0.69% per minute, compared with 23% and 40% for the Comparison Examples 26 and 25.

Repeat units:

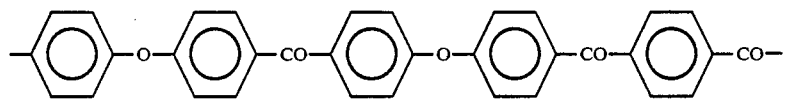

and

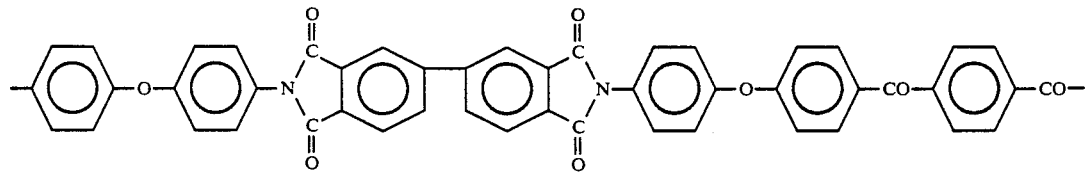

in the ratio 2.33:1.

About 6 kg of this polymer, made as described above, were extruded at 380 C. using a Baker-Perkins twin screw extruder, and the extrudate was granulated to give polymer chip.

DSC (10 C./min) gave a Tg of 191 C., a Tc of 249 C., and a Tm of 357 C. XRD measurements on an annealed sample showed a degree of crystallinity of between 25% and 35%.

EXAMPLE 22

A 10 litre Hastalloy B vessel was charged with 3.5 liters of dichloromethane. This was stirred and cooled to −16 C. The temperature was maintained at between −18 C. and −7 C. while aluminium chloride (1810 g, 13.58 mole) was added, followed by dimethylsulphone (266.4 g, 2.830 mole), 4,4'-diphenoxybenzophenone (393.02 g, 1.0726 mole), the bisimide BBI (551.69 g, 0.87758 mole), terephthaloyl chloride (383.06 g, 1.88679 mole), and benzoyl chloride (capping agent, 17.823 g, 0.12679 mole). A further 404 ml of dichloromethane was introduced during these additions to facilitate the quantitative transfer of reagents. The vessel was pressurised to 50 psi with nitrogen and the temperature was raised to 18 C. when the contents were transferred into a PTFE lined steel tube as in Example 21, and maintained at a temperature of 25 C. for 23 hours. The orange/brown rubbery polymer complex was then discharged from the tube, using a hydraulic ram, into a hammer mill where it was decomplexed in about 30 liters of a mixture of 95% by volume water and 5% by volume methanol which had been cooled to between 0 and 5 C. The resulting polymer was filtered and washed with about 20 liters of water three times, then stirred in a mixture of 27 liters of water and 7 liters of methanol for 29 hours after which time a second batch of polymer, made in essentially the same way, was added and the combined batches were then stirred for a further 16 hours. The mixture was then boiled and about 3 liters of distillate were removed before the polymer was filtered and washed again with about 20 liters of water three times. The polymer was then dried at 125 C. in air for 22 hours. The yield of yellow fibrous polymer was 2138 g (88.8%). The IV was 0.93 dl/g.

75 g of this polymer was further dried at 300 C. in air for about 17 hours. The melt viscosity after 5 minutes at 400 C. was 11050 poise at 500 Hz, 26100 poise at 85 Hz, and 43100 poise at 20 Hz. The melt viscosity after 30 minutes at 400 C. was 11500 poise at 500 Hz, 29600 poise at 85 Hz, and 55300 poise at 20 Hz. The average rate of increase in melt viscosity at 85 Hz over the 25 minute period was 0.54% per minute, compared with 23% and 40% as aforesaid.

Tensile properties at 20 C. of an annealed, extruded monofilament (0.35 mm diameter) were as follows;
8.5% elongation to yield
Yield stress=100 MPa
140% elongation to break
Ultimate tensile stress=160 MPa
Initial modulus=2500 MPA
At 180 C. the values were; 2.7%, 37 MPa, 450%, 76 MPa, and 1600 MPa respectively.

The polymer contained the repeat units

About 6 kg of this polymer, made as described above, were extruded at 400 C. using a Baker-Perkins twin screw extruder, and the extrudate was granulated to give polymer chip. The IV of this polymer chip was 108 dl/g.

DSC (10 C./min) gave a Tg of 202 C., a Tc of 291 C., and crystalline melting temperatures at both 345 C. and 387 C.

XRD measurements on an annealed sample showed a degree of crystallinity of between 25% and 35%.

A DMTA scan (1 Hz, 4 C./min, 50 C. to 300 C.) of an annealed, compression moulded sample showed that the flexural modulus dropped to 89.0% of the 50 C. value at 180 C., to 85.4% at 190 C., to 74.5% at 195 C., and to 51.2% at 200 C.

Some of the chip was extruded a second time and then a third time. The polymer darkened in colour very slightly but the extrusion conditions were unaltered and the IV of the polymer was unchanged. The extruded polymer and the reextruded samples all dissolved completely in 98% sulphuric acid to give clear solutions containing no gel.

EXAMPLE 23

The polymerisation of Example 3 was repeated using essentially the same procedure but with the following reactants;

Dichloromethane (21 ml), aluminium chloride (8.85 g, 0.0663 mole), diphenylsulphone (3.274 g, 0.01500 mole), terephthaloylchloride (2.0302 g, 0.010000 mole), benzoyl chloride (0.0928 g, 0.00066 mole), 4,4'-diphenoxybenzophenone (2.6496 g, 0.00723 mole), and the bisimide B2BI (1.9482 g, 0.00310 mole).

The work-up used was essentially the same as that

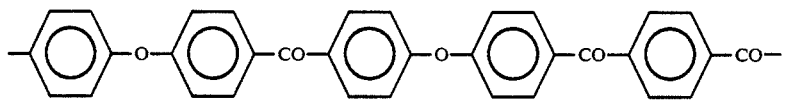

and

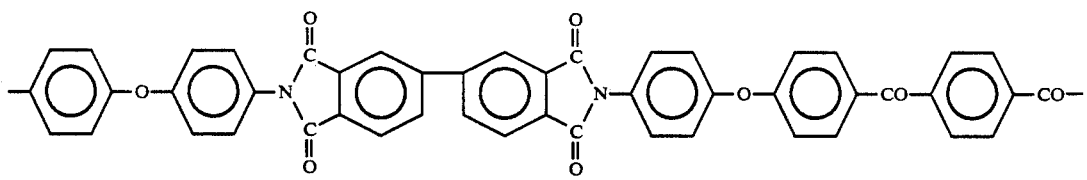

in the ratio 1.22:1.

described Example 22. The yield of polymer was 5.5 g (92%), and its IV was 0.63 dl/g. DSC showed a Tg of 193 C. and a Tm of 338 C.

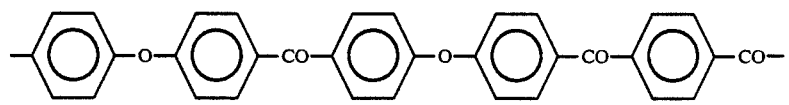

and

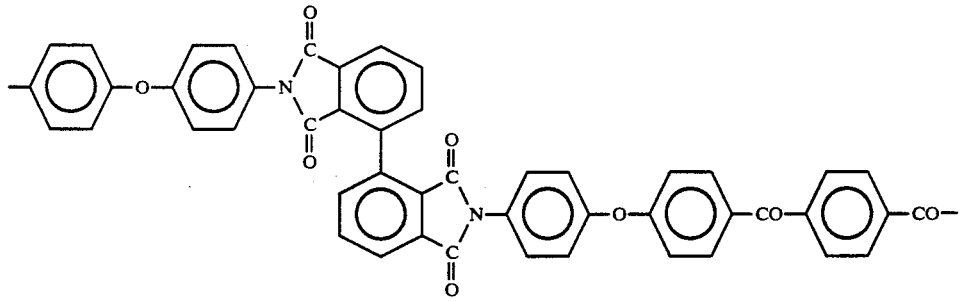

in the ratio 2.33:1.

EXAMPLE 24

The polymerisation of Example 3 was repeated using essentially the same procedure but with the following reactants;

Djchloromethane (98 ml), aluminium chloride (44.1 g, 0.331 mole), dimethylsulphone (7.06 g, 0.0750 mole), terephthaloylchloride (10.1510 g, 0.050000 mole), benzoyl chloride (0.4217 g, 0.003000 mole), 4,4'diphenoxybenzophenone (13.2094 g, 0.03605 mole), and the bisimide EBI (9.9598 g, 0.015450 mole).

The work-up used was essentially the same as that described in Example 22. The yield of polymer was 28 g. The IV was 0.93 dl/g. Elemental analysis; Al=740 ppm, Cl=50 ppm. DSC showed a Tg of 184 C., a Tc of 255 C., and a Tm of 347 C.

The polymer contained the repeat units

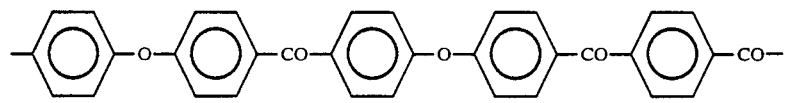

and

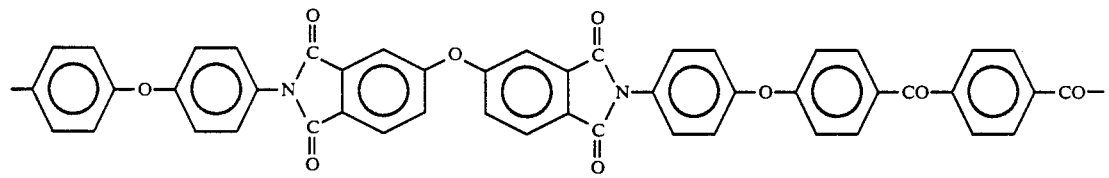

in the ratio 2.33:1.

EXAMPLE 25

Comparison

The polymerisation of Example 3 was repeated using essentially the same procedure but with the following reactants;

Djchloromethane (112 ml), aluminium chloride (41.5 g, 0.311 mole), N,N-dimethylformamide (6.961 g, 0.09524 mole), terephthaloyl chloride (9.6676 g, 0.04762 mole), benzoyl chloride (0.6828 g, 0.00486 mole), 4,4'diphenoxybenzophenone (13.7538 g, 0.03754 mole), and the bisimide PBI (6.9135 g, 0.01251 mole).

The yield of pale yellow fibrous polymer was 25.5 g (93.2%). It had an IV of 0.71 dl/g. Capillary rheology measurements at 400 C. showed that the polymer crosslinked quite rapidly and high pressures were needed to extrude a brittle fractured rod. Stable extrusion conditions could not be obtained but approximate 'melt' viscosities were 175000 poise after 2 minutes at 400 C., and 245000 poise after 3 minutes at 400 C., indicating an average rate of increase over the one minute period of 40% per minute.

The polymer contained the repeat units

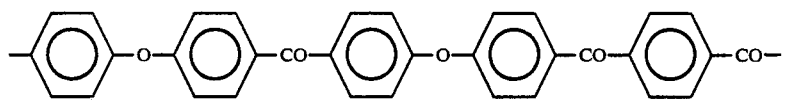

and

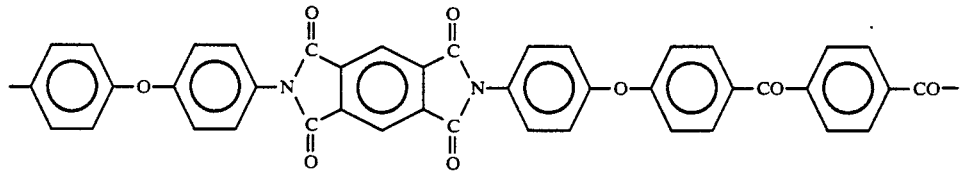

EXAMPLE 26

Comparison

The polymerisation of Example 3 was repeated using essentially the same procedure but with the following reactants;

Dichloromethane (118 ml), aluminium chloride (43.3 g, 0.325 mole), N,N-dimethylformamide (6.961 g, 0.09524 mole), terephthaloyl chloride (9.6676 g, 0.04762 mole), benzoyl chloride (0.6828 g, 0.00486 mole), 4,4'-diphenoxybenzophenone (13.7538 g, 0.03754 mole), and the bisimide KBI (8.2159 g, 0.01251 mole).

The yield of pale yellow fibrous polymer was 24.6 g (85.8%). It had an IV of 0.52 dl/g and had a melt viscosity of 9450 poise after 7 minutes at 400 C., 22400 poise after 16 minutes at 400 C., and 61300 poise after 31 minutes at 400 C., indicating an average rate of increase over the 24 minute period of 22.9% per minute.

The polymer contained the repeat units

[Structure showing phenylene-O-phenylene-CO-phenylene-O-phenylene-CO-phenylene-CO-]

and

[Structure showing phenylene-O-phenylene-N(imide with biphenyl)-N-phenylene-O-phenylene-CO-phenylene-CO-]

in the ratio 3:1.

We claim:

1. An ether-ketone-imide polymer comprising an imide repeat unit derived from a pre-existing imide monomer, which imide repeat unit has the formula (i) $-(Ar-O)_n-Ar-N$[biphenyl diimide]$N-$ $-Ar-(O-Ar)_n-\overset{O}{\underset{\|}{C}}-R_a-\overset{O}{\underset{\|}{C}}-$ or (ii) $-(Ar-O)_n-Ar-N$[diphenyl ether diimide]$N-$ $-Ar-(O-Ar)_n-\overset{O}{\underset{\|}{C}}-R_a-\overset{O}{\underset{\|}{C}}-$ wherein $R_a$ is a substituted or unsubstituted at least partly arylene moiety attached by arylene ring carbon atoms to the adjacent —CO— groups of the imide repeat unit;

each Ar independently is a substituted or unsubstituted arylene moiety; and each n independently is 1 or 2;

which ether-ketone-imide polymer is substantially free of unimidized amic acid moieties.

2. A polymer according to claim 1, wherein each Ar is independently substituted or unsubstituted p-phenylene; m-phenylene; 3,3'-, 3,4'-, or 4,4'-biphenylene; or 2,6-naphthylene.

3. A polymer according to claim 1, wherein $R_a$ is

[phenylene-O-phenylene],

[naphthylene], or

[biphenylene].

4. A polymer according to claim 1, wherein $R_a$ is m- or p-phenylene.

5. A polymer according to claim 1, wherein $R_a$ is p-phenylene.

6. A polymer according to claim 1, wherein all of the Ar moieties are phenylene.

7. A polymer according to claim 1, wherein the imide repeat unit is

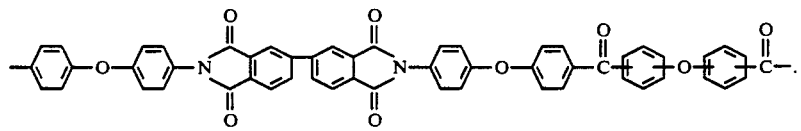

8. A polymer according to claim 1, wherein the imide repeat unit is

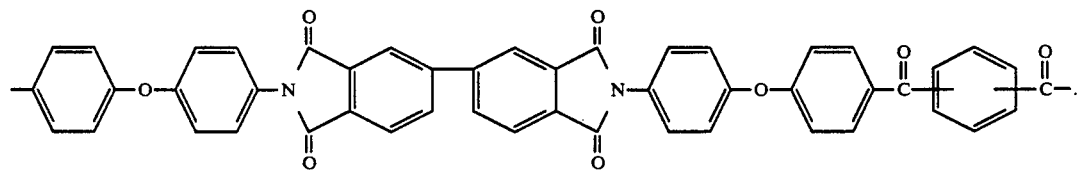

9. A polymer according to claim 1, wherein the imide repeat unit is

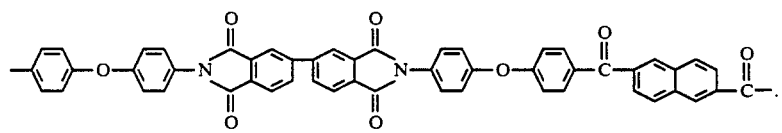

10. A polymer according to claim 1, wherein the imide repeat unit is

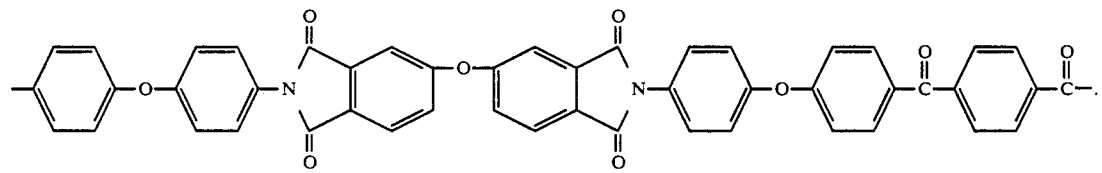

11. A polymer according to claim 1, which is partially crystalline.

12. A polymer according to claim 11, which has at least 20 percent crystallinity as measured by X-ray diffraction.

13. A polymer according to claim 1, wheein substantially all of the imide repeat units incorporate the unchanged cyclic imide form of the imide monomer.

14. An ether-ketone-imide copolymer comprising (I) an imide repeat unit as defined in any one of claims 1, to 10, and (II) a further repeat unit, which copolymer is substantially free of unimidized amic acid moieties.

15. An ether-ketone-imide copolymer comprising (I) an imdie repeat unit as defined in claim 1 and (II) a further repeat unit which is an arylene ether ketone repeat unit.

16. A copolymer according to claim 15, wherein the arylene ether ketone repeat unit is selected from the group consisting of:

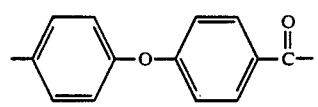

(V)

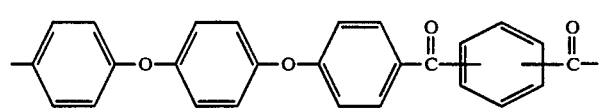

(VI)

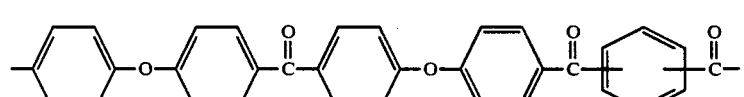

(VII)

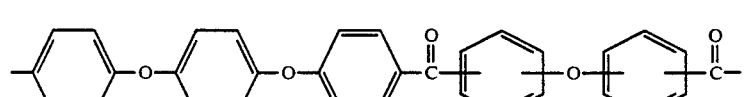

(VIII)

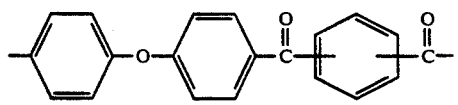 (IX)

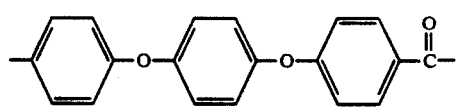 (X)

and

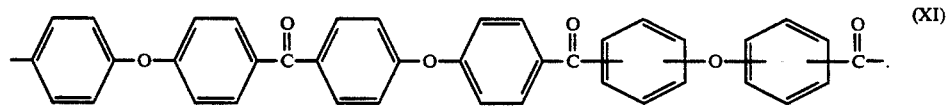 (XI)

17. A copolymer according to claim 16, wherein the imide repeat unit is

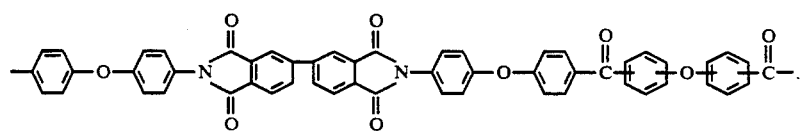

and the further repeat unit is of formula (V) or of the isomeric form of formula (XI) corresponding to the isomeric form of the imide repeat unit.

18. A copolymer according to claim 16, wherein the imide repeat unit is

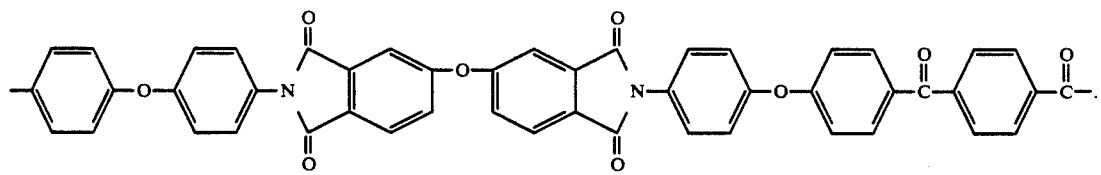

and the further repeat unit is of the isomeric form of formula (VII) corresponding to the isomeric form of the imide repeat unit.

19. A copolymer according to claim 16, wherein the imide repeat unit is

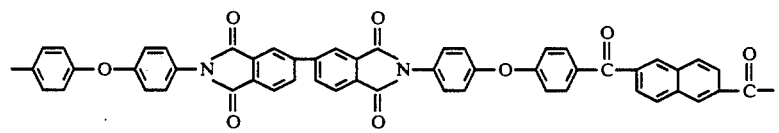

and the further repeat unit is of formula

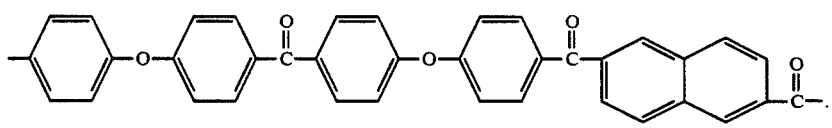

20. A copolymer according to claim 16, wherein the imide repeat unit is

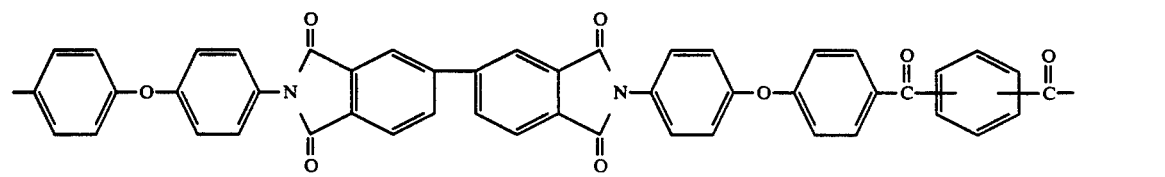

and the further repeat unit is the p-form of formula (VII).

21. A copolymer according to claim 15, which is partially crystalline.

22. A copolymer according to claim 15, which has at least 20 percent crystallinity as measured by X-ray diffraction.

23. A copolymer according to claim 15, comprising less than 50 mol percent of the imide repeat unit.

24. A method of manufacturing a polymer or copolymer according to claim 11 or 15, comprising polymerizing (a) an imide monomer corresponding to the part of said imide repeat unit containing the N atoms and having terminal Ar moieties, which terminal Ar moieties have either (Case 1) at least one reactive hydrogen and no acyl groups on each terminal Ar or (Case 2) at least one reactive hydrogen on one terminal Ar and acyl halide group on the other terminal Ar with (b) an aromatic diacyl halide in Case 1 or with itself in Case 2 in the presence of a Lewis acid catalyst.

25. A method according to claim 24, wherein a Lewis base controlling agent for the Lewis acid catalyst is included in the polymerization reaction mixture.

* * * * *